(12) United States Patent
Lin et al.

(10) Patent No.: US 7,254,650 B2
(45) Date of Patent: Aug. 7, 2007

(54) METHOD FOR DETERMINING TRANSMITTING MODE OF A MEMORY CARD WITH MULTIPLE INTERFACE FUNCTIONS

(75) Inventors: Chanson Lin, Jhubei (TW); Chung-Liang Lee, Taipei (TW); Jui-Jung Tai, Bade (TW)

(73) Assignee: Prolific Technology Inc., Taipei (TW)

( * ) Notice: Subject to any disclaimer, the term of this patent is extended or adjusted under 35 U.S.C. 154(b) by 390 days.

(21) Appl. No.: 10/884,995

(22) Filed: Jul. 7, 2004

(65) Prior Publication Data
US 2005/0251593 A1 Nov. 10, 2005

(30) Foreign Application Priority Data
May 5, 2004 (TW) ................ 93112632 A

(51) Int. Cl.
*G06F 3/00* (2006.01)
(52) U.S. Cl. .................. 710/11; 710/8; 710/10; 710/14
(58) Field of Classification Search ........... None
See application file for complete search history.

(56) References Cited

U.S. PATENT DOCUMENTS 7,069,369 B2 *  6/2006  Chou et al. .......... 710/301
2004/0070952 A1 *  4/2004  Higuchi et al. ........ 361/737
2005/0109841 A1 *  5/2005  Ryan et al. ........... 235/380
2005/0182881 A1 *  8/2005  Chou et al. ........... 710/301
2005/0251609 A1 * 11/2005  Chou et al. ........... 710/313
2006/0015673 A1 *  1/2006  Morrow .............. 710/315

* cited by examiner

Primary Examiner—Donald Sparks
Assistant Examiner—David Martinez
(74) Attorney, Agent, or Firm—Rosenberg, Klein & Lee

(57) ABSTRACT

A memory card with multiple interface functions is provided. The memory card comprises a multiple interface controller, comprising at least a USB processor, MMC/HS MMC processor and SD processor, and each processor individually connected to a data r/w controller and a shared interface bus, the data r/w controller connected to at least a data-storage medium, and shared interface bus connected to a computer system or IA product. The function of a mode detector/switch is used for detecting the compatible transmitting mode of the connected computer system or IA products, and to switch shared interface bus to match USB processor, MMC/HS MMC processor or SD processor for application. Thus, selecting transmitting mode between data r/w controller and the computer system or IA products connected thereto, the present invention does not only economize on the usage of card reader but also could be applied to various transmitting interface devices and enhancing on its user-friendly performance.

6 Claims, 4 Drawing Sheets

METHOD FOR DETERMINING TRANSMITTING MODE OF A MEMORY CARD WITH MULTIPLE INTERFACE FUNCTIONS

FIELD OF THE INVENTION

The present invention is related to a memory card, and more particularly to a memory card with multiple interface function, which does not only economize on the usage of conventional card reader but also suitable for applying on various transmission interface devices, and greatly enhance on the user-friendly performance thereof.

BACKGROUND OF THE INVENTION

Along with universalizing of IA (Internet Appliance) products, comes the fast growing on new format of storage media. The Memory Card has became the main stream in the present market due to its advantages of compact volume, minor power consumption and large storage capability. The Memory Card is quite suitable to apply on various types of IA products or computer systems; such as digital cameras, digital video cameras, MP3 players, mobile phones, PDA and GPS.

Further, due to the difference on design purpose, specification draw up time, selection on materials and leading company, there are full of many kinds of memory cards with different specifications and transmission modes on the market that annoying customers/users with their problems on compatibility. The examples of such are: MMC card (Multimedia Card), HS MMC (High Speed Multimedia Card), SD Card (Secure Digital Card), SM Card (Smart Card), MS Card (memory Stick Card) and CF Card (Compact Flash Card).

Furthermore, the transmission modes; especially the ones in smaller-volume memory cards that is used on IA products, of these Memory Cards has a significantly lower transmitting speed and amount when it comes to comparing with the USB (Universal Serial Bus) used on general IA products. This has always been a difficulty that desired to get overcome in the industry.

For this reason, professions in this industry had developed a data transfer device, as shown in FIG. 1. The main implementation is to place a Card Reader (15) in between each memory card; such as MMC card (10), HS MMC card (102), SD card (103), and other memory card (104); and the computer system (17). Each memory card could individually select a transmitting bus; MMC transmitting bus (150), HS transmitting bus (152), SD transmitting bus (153), and other transmitting bus (154); which complies with its transmission mode protocol for data transmitting. The USB transmission line (157) is used on the connection between Card Reader (15) and computer system (17). Although the data transfer is preferred to get adapt to the faster USB transmitting mode, however the transmission between the memory card (10) and Card Reader (15) is done at the slower speed memory-card transmitting mode. Thus, the speed in the entire data transferring system is done in the memory-card transmitting mode.

Moreover, each memory card 10, 102, 103 and 104 comprises at least one data-storage medium (11), which is controlled by the commands from a data r/w (read/write) controller (13). And thus digital data storage is made possible. Each memory card 10, 102, 103 and 104 could connect to a compatible IA product via a transmitting bus of compatible transmitting mode. Such transmitting buses could be MMC transmitting bus (180), HS MMC transmitting bus (182), SD transmitting bus (183) and other transmitting bus (184). The memory cards support MMC IA products (19), HS MMC IA products (192), SD IA products (193), and IA products of other interface (194). Each and every memory card has an individual transmission protocol, therefore, although they might be compatible structurally but would not be able to communicate and archive with each other's data; the case of two-way compatibility is rarely seen. Thus, it is rather not a user-friendly system and it adds consumer's cost on purchasing memory cards.

SUMMARY OF THE INVENTION

Therefore, the main emphasis of the present invention is to provide a memory card of originality for economizing the usage of Card Reader and suitable to apply on various types of interface device. Thus further enhancing the user-friendly performance for consumer.

It is the primary object of the present invention to provide a memory card with multiple interface functions. The main principle is to place a multiple interface controller within the memory card to connect to the host system via a shared interface bus. The multiple interface controller could detect compatible transmitting modes that host system holds and use it to set the transmitting mode of shared interface bus and multiple interface controller. This provides a way that is applicable and compatible to hosts of different specifications, and thus saves on costs of purchasing different memory cards.

It is another object of the present invention to provide a memory card with multiple interface functions that is applicable to various host systems of different specifications through using of a multiple interface controller and a shared interface bus. Thus, to enhance on convenience and humanization of using memory cards.

It is still another object of the present invention to provide a memory card with multiple interface functions. The memory card could connect to a computer system without using conventional Card Reader and adapt to USB transmitting mode with faster transmitting speed to the entire system. In this way, it is convenient and portable to users and greatly increases on speed of data transmission.

Thus, in order to achieve the above-mentioned inventions, a preferred embodiment of the present invention mainly comprises of: a data-storage medium, a multiple interface controller including a memory-card protocol processor which connecting to data-storage medium via a data r/w (read/write) controller, and a shared interface bus that separately connects to the memory-card protocol processor and a host system. Wherein, the shared interface bus further comprises plural interface protocol and executes a transmitting mode; that could be as USB transmitting mode, HS MMC transmitting mode, MMC transmitting mode and SD transmitting mode; between the multiple interface controller and the host system by using a mode detector/switch.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

The various objects and advantages of the present invention will be more readily understood from the following detailed description when read in conjunction with the appended drawings, in which:

BRIEF DESCRIPTION OF DRAWINGS

FIG. 2A: a structural diagram of the memory card in a preferred embodiment of the present invention;

DETAILED DESCRIPTION OF THE INVENTION

Figure 1:
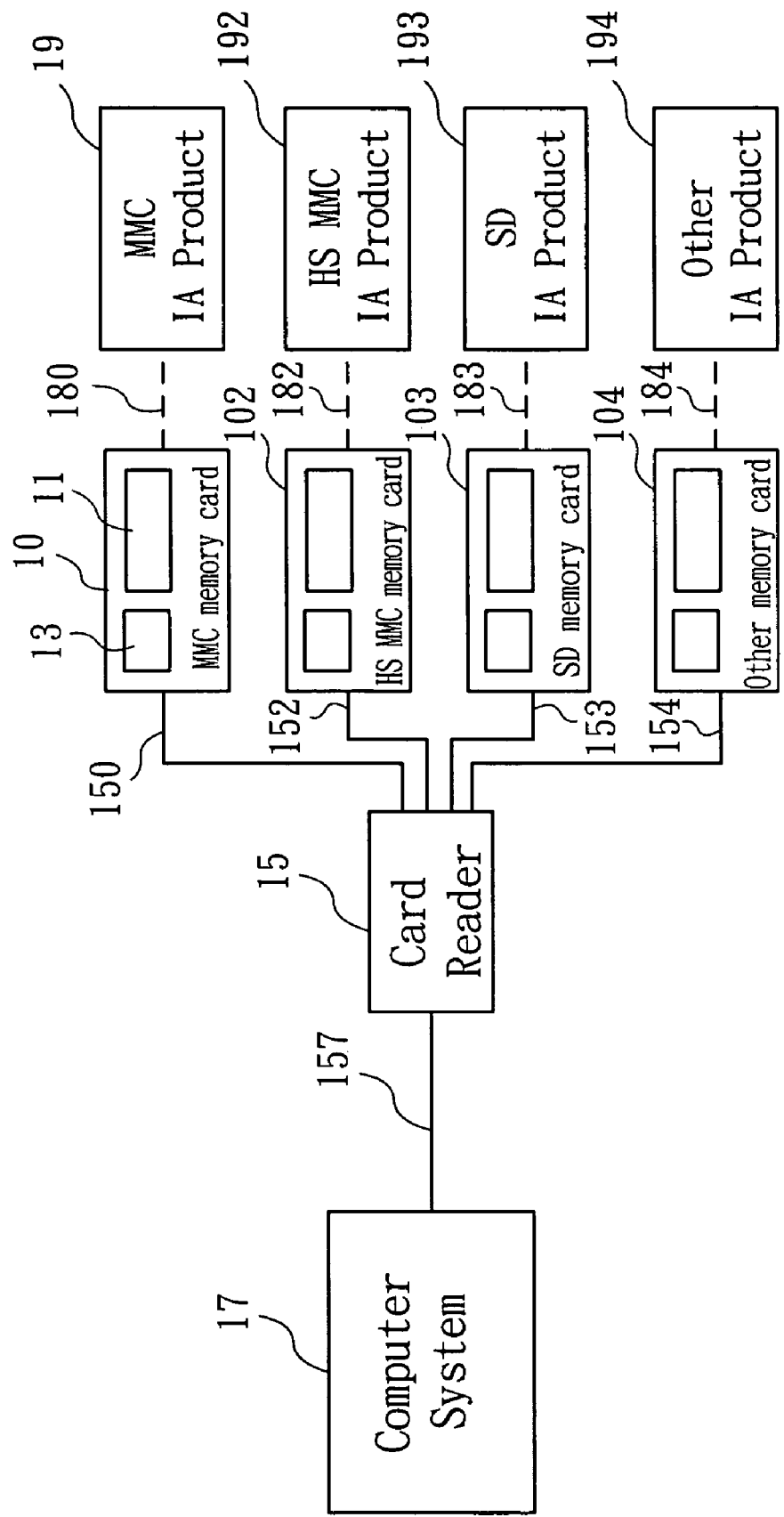
FIG. 1: a structural diagram of the connection between the conventional memory card and a host system.
Figure 2:
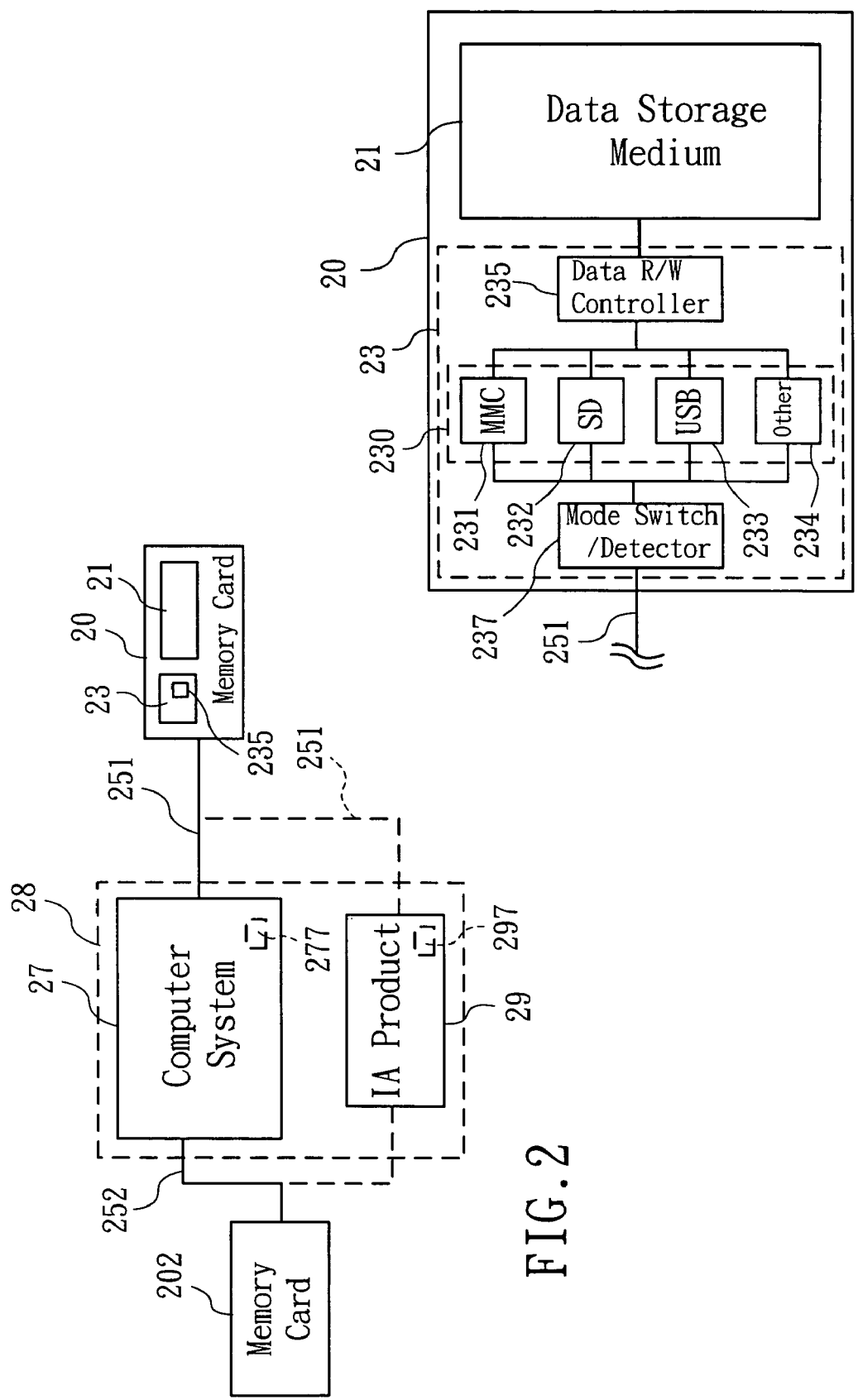
FIG. 2: a structural diagram of the connection between the memory card in a preferred embodiment the present invention and a host system.

Firstly, please referred to FIG. 2: a structural diagram of the connection between the memory card in a preferred embodiment the present invention and a host system; and FIG. 2A: a structural diagram of the memory card in a preferred embodiment of the present invention. As shown in the diagrams, the memory card (20) mainly comprises of a data-storage medium (21) for storage digital data, and a multiple interface controller (23). Wherein, the multiple interface controller (23) further includes a memory card protocol processor (230) that could be a MMC/HS MMC processor (231), a SD processor (232), a USB processor (233) or a other interface processor (234). One end of each MMC/HS MMC processor (231), SD processor (232), USB processor (233) and other interface processor (234) could work with and connect to a data r/w controller (235) for reading/writing or storage digital data in a data-storage medium (21). The other end of each above-mentioned processor could be connected to a shared interface bus (251) via a mode detector/switch (237), and the shared interface bus (251) then further connects to a host system (28). Wherein the host system (28) could be IA products (29): digital camera, digital video camera, MP3 player, mobile phone, PDA, GPS, or computer system (27): desk top, laptop etc.

When shared interface bus (251) is separately connected to a host system (28) and a memory card (20), the mode detector/switch (237) in the memory card (20) would scan for the transmitting modes that are held by the host system (28). In other words, the mode detector/switch (237) is there to identify whether the compatible transmitting mode(s) held by the host system (28) is a USB transmitting mode, HS MMC transmitting mode, MMC transmitting mode or SD transmitting mode, and then set the transmitting modes (not shown) to be the same for conducting transmission. If there exists more than two compatible transmitting modes, then this preferred embodiment of the present invention would choose the one with higher transmitting speed as the transmitting mode, for example, the USB transmitting mode.

After the transmitting mode has been detected and set, the shared interface bus (251), which comprises plural interface protocols, would also choose the set mode to be a USB transmitting mode, HS MMC transmitting mode, MMC transmitting mode, SD transmitting mode or other interface transmitting mode. Consequently, the memory card protocol processor (230) would also decide on the matched processor to be a MMC/HS MMC processor (231), SD processor (232), USB processor (233), or other interface processor (234). In this way, a complete protocol for data transmission could be built between host system (28) and data-storage medium (21) for direct digital data reading or storage without utilizing conventional Card Reader.

Further, the other interface processor (234) could also be set as a SM processor, MS processor or the composition of the two. The mode detector/switch (237) don't have to be placed within the memory card (20), it could also choose to be placed within the computer system (27): the mode detector/switch (277), or the IA products (29): the mode detector/switch (297).

Because of that the memory card (20) in a preferred embodiment of the present invention comprises plural MMC/HS MMC processor (231), SD processor (232), USB processor (233), or other interface processor (234), and it works with shared interface bus (251) of plural interface protocol. Hence, no matter if it is connected to computer system (27) or comprised into IA products (29), it could find a suitable and compatible data transmitting mode and select the one with highest speed. Therefore, it is not only convenient and user-friendly but also greatly enhances data transmitting speed.

Furthermore, in another preferred embodiment of the present invention, the host system (28) could also connect to a conventional memory card (202) by utilizing shared interface bus (252) and detect which transmitting mode does the conventional memory card (202) or the host system (28) supports via the mode detector/switch (277) (297) within the host system (28). After the transmitting mode has been set, the mode detector/switch (277) (297) would also set the shared interface bus (252) to be a USB transmitting mode, HS MMC transmitting mode, MMC transmitting mode, SD transmitting mode or other interface transmitting mode. By doing so, the digital data stored within the memory card could also be read or stored without presence of Card Reader.

Figure 3:
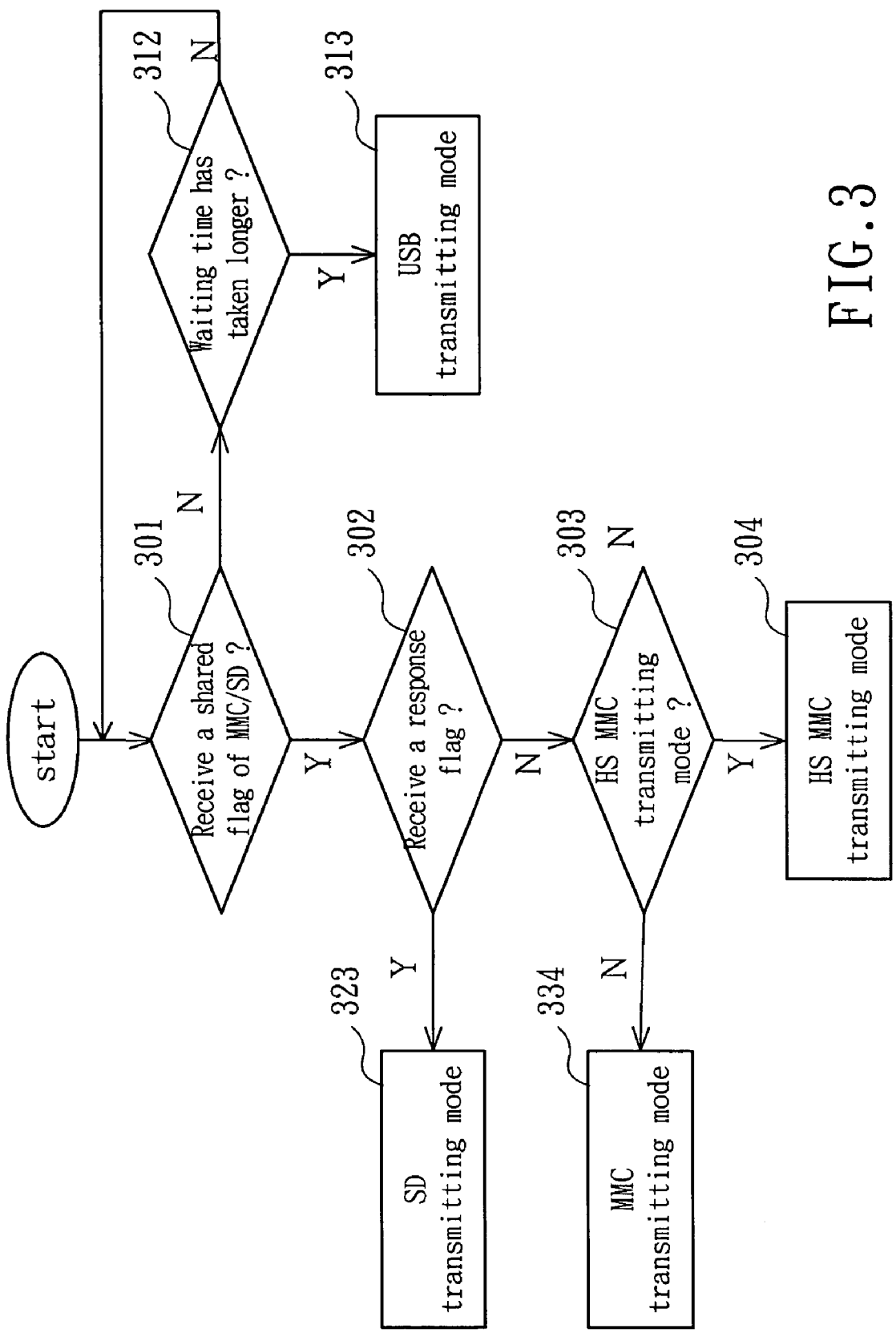
FIG. 3: the follow diagram of the memory card in a preferred embodiment of the present invention during the processing of the mode selection.

Moreover, please refer to FIG. 3: the follow diagram of the memory card in a preferred embodiment of the present invention during the processing of the mode selection. As show in the diagram, the steps for choosing the transmitting mode when the memory card (20) of the present invention is connected to a host system (28) using shared interface bus (251) are:

Step 301: waiting to receive a shared flag of a MMC/SD transmitting mode; proceed to Step 302 with the result is affirmative, go to Step 312 when it is negative.

Step 312: detect whether if the waiting time has taken longer than predetermined threshold; go back top Step 301 and keep waiting to receive shared flag of a MMC/SD transmitting mode; proceed to Step 313 for execution when affirmative.

Step 313: represents that the transmitting mode is not a MMC transmitting mode or SD transmitting mode. Thus, set the host system (28) and shared interface bus (251) to be a USB transmitting mode working with a USB processor (233).

Step 302: representing the connected host system (28) is in one of the MMC transmitting mode HS MMC transmitting mode or SD transmitting mode. Thus, first to wait for receiving a SD response flag; carry on execute Step 303 if negative, or proceed to Step 323 when affirmative.

Step 323: the SD response flag has been received and set the host system (28) and shared interface bus (251) to be a SD transmitting mode that works with a SD processor (232).

Step 303: shows that the host system (28) is one of the MMC transmitting mode or HS MMC transmitting mode. Thus, wait to check whether a HS MMC response flag has been received; keep the execution of the Step 304 if affirmative; proceed to Step 334 if negative.

Step 334: a HS MMC response flag was not received, set the host system (28) and shared interface bus (251) to be a MMC transmitting mode and choose a MMC/HS MMC processor (231) for compatible usage.

Step 304: shows a HS MMC response flag has been received thus set the host system (28) and shared interface bus (251) to be a HS MMC transmitting mode and choose a MMC/HS MMC processor (231) for compatible usage.

By following the above-described steps, memory card (20) could easily choose a compatible type of memory card protocol processor (230): MMC/HS MMC processor (231), SD processor (232) or USB processor (233). On the other hand, the shared interface bus (251) could also choose a compatible interface protocol. In this way, a memory card (20) could compatibly connect to the host system (28).

Figure 4:
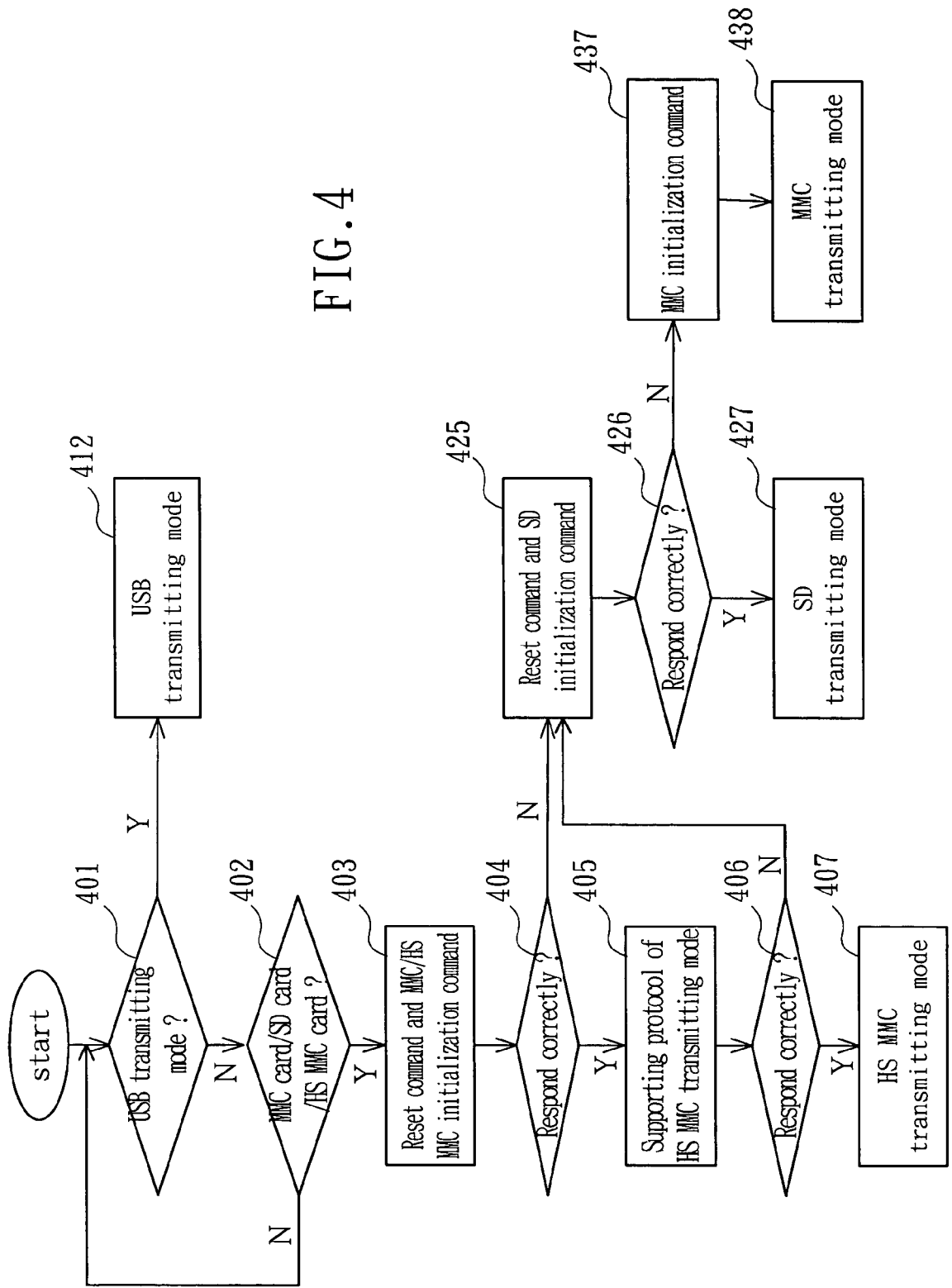
FIG. 4: the follow diagram of the processing of the mode switching of the host system while it connecting to the memory card in a preferred embodiment of the present invention.

Lastly, please refer to FIG. 2: a structural diagram of the connection between the memory card in a preferred embodiment the present invention and a host system, and FIG. 4: the follow diagram of the processing of the mode switching of the host system while it connecting to the memory card in a preferred embodiment of the present invention. As shown in the diagrams, when the memory card (20) (202) of the present invention connects to a host system (28), the steps for host system on choosing of transmitting modes are:

Step 401: host system (28) detects a connection to shared interface bus (251) and identifies whether the connected memory cards (20) (202) support a USB compatible transmitting mode. Proceed to Step 402 if negative, otherwise proceed to Step 412.

Step 412: shows the connected memory cards (20) (202) support USB transmitting mode and thus directly set the host system (28) and shared interface bus (252) to be a USB transmitting mode.

Step 402: shows the connected memory cards (20) (202) do not support USB transmitting mode, thus it further detects whether the connected memory cards (202) is a MMC card, HS MMC card or SD card. Proceed to Step 403 if positive, otherwise proceed back to Step 401 and keep waiting for a connection of a memory card that is supported by a shared interface bus (251).

Step 403: shows the memory card (202) would support MMC/HS MMC transmitting mode or SD transmitting mode. Thus, the host system (28) would order a reset command and HS MMC/MMC initialization command.

Step 404: the host system (28) would detect whether the memory card (202) responds correctly to the HS MMC/MMC initialization command. Go on to execute Step 405 if affirmative, otherwise proceed to Step 425.

Step 405: Proceed supporting protocol communication of HS MMC transmitting mode.

Step 406: host system (28) would detect whether the memory card (202) has correct respond to HS MMC supporting protocol. Proceed to Step 407 if affirmative otherwise execute Step 425.

Step 407: shows the connected memory card (202) does support HS MMC transmitting mode. Thus, directly sets the host system (28) and shared interface bus (252) to be a HS MMC transmitting mode.

Step 425: shows the connected memory card (202) does not support MMC/HS MMC transmitting mode or HS MMC transmitting mode. Therefore, the host system (28) would order a reset command and SD initialization command.

Step 426: the host system (28) would detect whether memory card (202) has correct respond to SD initialization command. Proceed to Step 427 if positive otherwise proceed to Step 437.

Step 427: shows that the connected memory card (202) does support SD transmitting mode. Thus, directly set the host system (28) and shared interface bus (252) to be a SD transmitting mode.

Step 437: shows the connected memory card (202) solely supports MMC transmitting mode. Thus the host system (28) will order MMC initialization command.

Step 438: shows the connected memory card (202) supports MMC transmitting mode. Therefore, directly set the host system (28) and the shared interface bus (252) to be a MMC transmitting mode.

By following the above-described steps, the host system (28) and the shared interface bus (252) could easily choose a desired transmitting mode: a USB transmitting mode, a HS MMC transmitting mode, a SD transmitting mode or MMC transmitting mode. Therefore it could be used to work with memory card (202) of different specifications without using conventional Card Reader.

To sum up, it should be clear that the present invention is related to a memory card; especially to a memory card with multiple interface function, which does not only economize on the usage of conventional card reader but also suitable for applying on various transmission interface devices, and thus greatly enhance on its user-friendly performance.

Although the present invention has been described with reference to the preferred embodiment thereof, it will be understood that the invention is not limited to the details thereof. Various substitutions and modifications have suggested in the foregoing description, and other will occur to those of ordinary skill in art. Therefore, all such substitutions and modifications are intended to be embraced within the scope of the invention as defined in the appended claims.

What is claimed is:

1. A memory card with multiple interface functions, comprising:
    a data storage medium;
    a multiple interface controller comprising a memory card protocol processor connected to said data storage medium through a data r/w controller; and
    a shared interface bus connected to said memory card protocol processor and a host system respectively, said shared interface bus being compatible with a plurality of transmission interface protocols, said protocol processor selecting a transmitting mode including one of a serial transmitting mode, a first flash memory card transmitting mode, a second flash memory card transmitting mode and a third flash memory card transmitting mode for communication between said multiple interface controller and said host system through a mode detector/switch;
    whereby selecting a transmission mode comprises the steps of:
        waiting to receive a shared flag for indicating one of the first, second, or third flash memory transmitting modes;
        detecting whether a waiting time to receive said shared flag has exceeded a predetermined time threshold; if not, continue waiting to receive said shared flag; if yes, executing said serial transmitting mode;

determining whether a response flag for said third flash memory card transmitting mode has been received; if yes, executing said third flash memory card transmitting mode; and determining whether a response flag for said first flash memory card transmitting mode has been received; if yes, executing said first flash memory card transmitting mode; if not, executing said second flash memory card transmitting mode.

2. The memory card of claim 1, wherein said memory card protocol processor is selected from the group consisting of a serial communication processor, first flash memory card protocol processor, a second flash memory card protocol processor, a third flash memory card protocol processor, and the combination thereof.

3. The memory card of claim 1, wherein said memory card protocol processor is selected from the group consisting of a fourth flash memory card protocol processor, a fifth flash memory card protocol processor and the combination thereof, said memory card processor further selecting one of a a fourth flash memory card transmitting mode or a fifth flash memory card transmitting mode between said multiple interface controller and said host system.

4. The memory card of claim 1, wherein said mode detector/switch is provided within said multiple interface controller, and connected to said memory card protocol processor and said shared interface bus respectively.

5. The memory card of claim 1, wherein said mode detector/switch is provided within said host system, and connected to said shared interface bus.

6. The memory card of claim 1, wherein said host system is selected the group consisting of a computer system, a global computer network appliance product and the combination thereof.

* * * * *